Sept. 20, 1971 V. KNOTT ET AL 3,606,373
TANDEM WHEEL UNDERCARRIAGE
Filed Aug. 25, 1969 2 Sheets-Sheet 1

INVENTORS.
Valentin Knott
Ernst Pelzl
By: Kelman and Berman
AGENTS

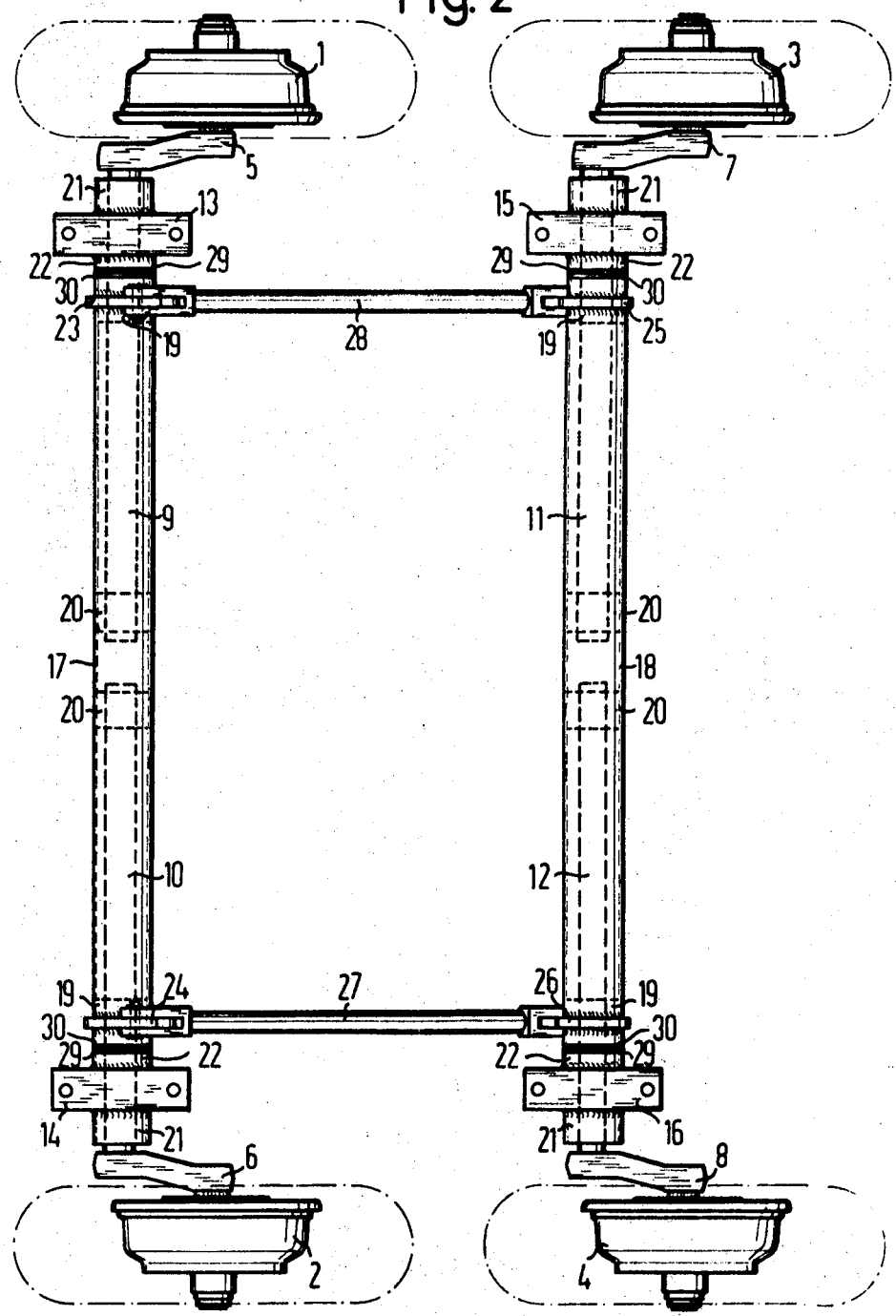

United States Patent Office 3,606,373
Patented Sept. 20, 1971

3,606,373
TANDEM WHEEL UNDERCARRIAGE
Valentin Knott, 15 Obinger Strasse, 8201 Eggstatt, Germany, and Ernst Pelzl, 79 Hemhof, 8201 uber Rosenheim, Germany
Filed Aug. 25, 1969, Ser. No. 852,818
Int. Cl. B60g 19/02
U.S. Cl. 280—104.5                                              6 Claims

ABSTRACT OF THE DISCLOSURE

The four wheels of a tandem wheel undercarriage for a trailer are mounted on the free ends of radial arms projecting from outer ends of individual shafts, the inner ends of each pair of shafts being received in a tubular member. Annular rubber torsion springs connect the inner shaft ends to the enveloping tubular member and the outer shaft ends to bearing blocks on the undercarriage frame in which the outer shaft ends are rotatably received. The radial arms normally extend obliquely downwardly and rearwardly from the associated shafts in a common direction. The two tubular members are coupled by two rods hinged to lugs on the tubular members in such a manner that the tubular members turn simultaneously in opposite directions about their axes.

---

Figure 1:
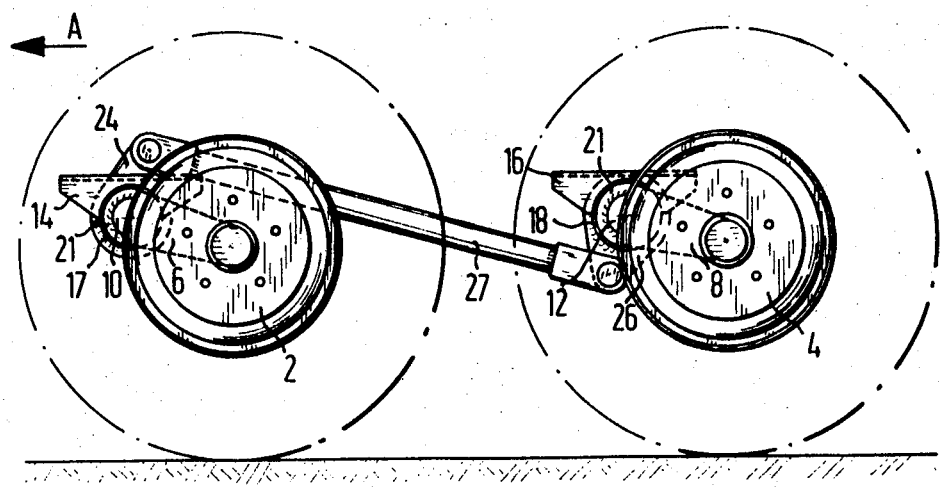

This invention relates to four-wheeled undercarriages, and particularly to undercarriages suitable for trailers, though not necessarily limited to such applications.

An object of the invention is the provision of an undercarriage which is simple and rugged in its construction, yet capable of absorbing the effects of uneven terrain over which the undercarriage travels and of damping oscillations of a load supported thereon independently for each side of the undercarriage.

In one of its more specific aspects the invention resides in a tandem undercarriage which includes two pairs of shafts, the shafts of each pair having a common axis and being axially aligned, the two common axes extending in a common direction and being spaced from each other transversely of this direction. Each shaft has an inner axial end portion adjacent the other shaft of the pair and an outer axial end portion remote from the other shaft.

An arm radially extends from each outer shaft end portion and has a free end remote from the associated shaft. Fastening means fasten the shaft to a frame in such a position that the arms extend from the associated shafts substantially in the same direction. The fastening means include a plurality of annular torsion springs of elastomeric material which are interposed between the frame and each of the outer and inner end portions of the shafts.

The exact nature of this invention as well as other objects and advantages thereof will be readily apparent from consideration of the following specification relating to the annexed drawing in which:

FIG. 1 shows a tandem wheel undercarriage of the invention in side elevation and partly in phantom view; and FIG. 2 illustrates the apparatus of FIG. 1 in top plan view.

Referring now to the drawing in detail, there are seen the four brake housings 1, 2, 3, 4 which serve as wheel mountings for the four wheels of the partly illustrated boat trailer, the wheels being indicated in chain-dotted lines in phantom view for greater clarity. The four wheel mountings are rotatably fastened to the free ends of arms 5, 6, 7, 8 which extend radially from outer end portions of respective shafts 9, 10, 11, 12 journaled in bearing blocks 13, 14, 15, 16 adjacent the arms. The upwardly directed bases of the bearing blocks are normally fixedly fastened to the frame of the boat trailer, and are thus integral elements of the frame, not otherwise shown.

The inner end portions of the shafts 9, 10 which carry the front wheel mountings 1, 2 are coaxially aligned in a tubular member 17, and the rear wheel shafts 11, 12 are similarly received in a tubular member 18, the two pairs of shafts having respective common axes which normally extend in a common horizontal plane.

Each shaft is secured to the associated tubular member and bearing block by four annual rubber torsion springs, each spring consisting essentially of an outer circularly arcuate metal shell, an inner annular metal shell, and a ring of rubber radially interposed between the shells and vulcanized to the same. The torsion springs are not shown in detail since they may be entirely conventional in themselves.

One annular torsion spring 19 is radially interposed between each axially terminal portion of each tubular member 17, 18 and the shaft received therein. A second torsion spring 20 secures the inner end of each shaft to the enveloping tube. The inner shells of two torsion springs 21, 22 are mounted on each outer shaft end on opposite axial sides of the bearing block in which the shaft end is journaled, and the outer shells of both springs 21, 22 are fastened to the bearing block.

Lugs 23, 24 project radially from the two axial ends of the tubular member 17, and two similar lugs 25, 26 on the tubular member 18 are aligned with the lugs 23, 24 at right angles to the common axes of the two shaft assemblies. In the normal condition of the undercarriage, the lugs 23, 24 project approximately upwardly from the tubular front member 17 while the lugs 25, 26 project approximately downwardly from the rear tubular member 18. The longitudinal ends of a rigid connecting rod 27 hingedly link the lugs 24, 26 on the left side of the undercarriage, as viewed in the direction of normal travel indicated by the arrow A in FIG. 1, and a rod 28 similarly connects the lugs 23, 25.

Thrust washers 29, 30 coaxially mounted on the outer end portions of each of the shafts 9, 10, 11, 12 between the transverse end faces of the tubular members 17, 18 and the torsion springs 22 axially define the positions of the tubular members between the bearing blocks 13, 14, 15, 16.

If one of the wheels travels over a projection on the roadway, the associated radial arm is swung counterclockwise, as viewed in FIG. 2, and the resulting angular movement of the associated tubular member 17 causes the rear tubular member 18 and the wheels mounted thereon to be swung clockwise, though through a smaller angle, and the load carried by the undercarriage is jolted much less than in would be by wheels sprung independent from each other. The annular torsion springs described have been found to have a long life and to give reliable service. The hardness and the dimensions of the elastomeric ring which is the core of each torsion spring are readily selected for the desired response to angular displacement of the inner and outer shells under an intended static or dynamic load.

What is claimed is:
1. An undercarriage comprising, in combination:
 (a) frame means;
 (b) two pairs of shafts;
  (1) the shafts of each pair having a common axis and being axially aligned,
  (2) said common axes extending in a common direction and being spaced from each other transversely of said direction,

(3) each shaft having an inner axial end portion adjacent the other shaft of the pair and an outer axial end portion remote from said other shaft;

(c) an arm radially extending from each of said outer end portions and having a free end remote from the the associated shaft;

(d) fastening means fastening said shafts to said frame means in a position in which said arms extend from the associated shafts substantially in the same direction, said fastening means including (1) a plurality of annular torsion springs of elastomeric material operatively interposed between said frame means and each of said inner and outer end portions, (2) two tubular members respectively receiving therein said inner end portions of said pairs of shafts, said outer end portions axially projecting from respective end faces of said tubular members, one of said torsion springs being interposed between each of said inner end portions and the associated tubular member, (3) securing means securing said tubular members to said frame means, each of said tubular members being secured to said frame means for angular displacement about the common axis of the shafts received therein, and (4) linkage means connecting said tubular members for simultaneous angular displacement in opposite directions; and (e) a wheel mounting on each of said free ends.

2. An undercarriage as set forth in claim 1, wherein said linkage means include a lug member radially projecting from each of said tubular members, and a rigid elongated member having respective longitudinally terminal portions hingedly fastened to said lug members respectively.

3. An undercarriage comprising, in combination:
(a) frame means;
(b) two pairs of shafts;
(1) the shafts of each pair having a common axis and being axially aligned,
(2) said common axes extending in a common direction and being spaced from each other transversely of said direction,
(3) each shaft having an inner axial end portion adjacent the other shaft of the pair and an outer axial end portion remote from said other shaft;
(c) an arm radially extending from each of said outer end portions and having a free end remote from the associated shaft;
(d) fastening means fastening said shafts to said frame means in a position in which said arms extend from the associated shafts substantially in the same direction, said fastening means including
(1) a plurality of annular torsion springs of elastomeric material operatively interposed between said frame means and each of said inner and outer end portions,
(2) two tubular members respectively receiving therein said inner end portions of said pairs of shafts, said outer end portions axially projecting from respective end faces of said tubular members, one of said torsion springs being interposed between each of said inner end portions and the associated tubular member,
(3) securing means securing said tubular members to said frame means, said securing means including a plurality of bearing members rotatably receiving the outer end portions of said shafts respectively, each face being axially spaced from the associated bearing members receiving the outer portion of a shaft projecting from said face; and
(e) a wheel mounting on each of said free ends.

4. An undercarriage as set forth in claim 3, further comprising a thrust washer axially interposed between each of said end faces and the associated bearing member.

5. An undercarriage comprising, in combination:
(a) frame means;
(b) two pairs of shafts;
(1) the shafts of each pair having a common axis and being axially aligned,
(2) said common axes extending in a common direction and being spaced from each other transversely of said direction,
(3) each shaft having an inner axial end portion adjacent the other shaft of the pair and an outer axial end portion remote from said other shaft;
(c) an arm radially extending from each of said outer end portions and having a free end remote from the associated shaft;
(d) fastening means fastening said shafts to said frame means in a position in which said arms extend from the associated shafts substantially in the same direction, said fastening means including
(1) a plurality of annular torsion springs of elastomeric material operatively interposed between said frame means and each of said inner and outer end portions,
(2) two tubular members respectively receiving therein said inner end portions of said pairs of shafts, the outer end portions projecting from respective end faces of said tubular members,
(3) a plurality of bearing members on said frame means respectively receiving said outer end portions,
(4) at least one of said torsion springs being interposed between each inner end portion and the inner end portion and the tubular member receiving the same, and at least one other torsion spring being interposed between each outer end portion and the bearing member receiving said outer end portion;
(e) linkage means connecting said tubular members for simultaneous angular displacement about the respective common axes of the shafts received therein, said linkage means including
(1) a pair of lug members radially projecting from each of said tubular members in axially spaced relationship, each lug member being aligned with a corresponding lug member on the other tubular member in a direction transverse to said axes, and
(2) two rigid elongated connecting members having each two longitudinally terminal portions hingedly connecting the alinged lug members respectively, and
(f) a wheel mounting on each of said free ends.

6. An undercarriage as set forth in claim 5, wherein said common axes extend substantially in a common plane, and said arms are obliquely inclined relative to said common plane.

References Cited

UNITED STATES PATENTS

| | | | |
|---|---|---|---|
| 2,286,609 | 6/1962 | Ledwinnka | 280—124.3X |
| 2,410,747 | 11/1946 | Reid | 267—57.1X |

FOREIGN PATENTS

| | | | |
|---|---|---|---|
| 1,134,998 | 4/1957 | France | 280—124.3 |

PHILIP GOODMAN, Primary Examiner

U.S. Cl. X.R.

280—124.3; 267—57.1